(12) United States Patent
Killich et al.

(10) Patent No.: US 7,511,273 B2
(45) Date of Patent: Mar. 31, 2009

(54) IMAGE CONVERTER WITH HEATABLE CONVERTER LAYER

(75) Inventors: Frank Killich, Gottingen (DE); Stephan Wieneke, Göttingen (DE); Wolfgang Viöl, Adelebsen (DE)

(73) Assignee: Cinogy GmbH, Duderstadt (DE)

( * ) Notice: Subject to any disclaimer, the term of this patent is extended or adjusted under 35 U.S.C. 154(b) by 0 days.

(21) Appl. No.: 11/875,153

(22) Filed: Oct. 19, 2007

(65) Prior Publication Data
US 2008/0042062 A1 Feb. 21, 2008

Related U.S. Application Data

(63) Continuation-in-part of application No. PCT/EP2006/003547, filed on Apr. 19, 2006.

(30) Foreign Application Priority Data
Apr. 23, 2005 (DE) .................. 10 2005 018 965

(51) Int. Cl.
*G01J 5/00* (2006.01)

(52) U.S. Cl. ..................................... 250/330
(58) Field of Classification Search .................. 250/330
See application file for complete search history.

(56) References Cited

U.S. PATENT DOCUMENTS 3,365,577 A * 1/1968 Teeg et al. .................. 250/330
4,755,673 A * 7/1988 Pollack et al. ............... 250/330

FOREIGN PATENT DOCUMENTS

DE 535 208 9/1929
DE 101 58 859 B4 2/2004

\* cited by examiner

*Primary Examiner*—Constantine Hannaher
(74) *Attorney, Agent, or Firm*—Thomas, Kayden, Horstemeyer & Risley, LLP

(57) ABSTRACT

An image converter (1) for the visualizing an intensity distribution of an electromagnetic radiation (3), the image converter (1) comprises a converter layer (2), which at least partly converts the incident electromagnetic radiation (3) into heat and hence converts the intensity distribution of the incident electromagnetic radiation (3) into a temperature distribution over the converter layer (2), and a heating device (5, 7) for increasing the temperature of the converter layer (2).

20 Claims, 4 Drawing Sheets

IMAGE CONVERTER WITH HEATABLE CONVERTER LAYER

CROSS REFERENCE TO RELATED APPLICATIONS

This application is a continuation in part of International Patent Application PCT/EP2006/003547 entitled "Bildwandler mit einer beheizbaren Wandlerschicht", filed on Apr. 19, 2006, and claiming priority to co-pending German Patent Application No. DE 10 2005 018 965.2 also entitled "Bildwandler mit einer beheizbaren Wandlerschicht", filed Apr. 23, 2005.

FIELD OF THE INVENTION

The invention generally relates to an image converter for visualizing an intensity distribution of an electromagnetic radiation. More particularly, the invention relates to an image converter for visualizing an intensity distribution of an electromagnetic radiation, the image converter comprising a converter layer which adopts a temperature distribution corresponding to the intensity distribution of the incident electromagnetic radiation.

Such an image converter is used to convert an intensity distribution of an electromagnetic radiation, which is as such not directly visible to the human eye, and/or to which the human eye may not be directly subjected, and/or which can not be directly recorded and/or which requires high efforts in directly recording or evaluating, into a two-dimensional intensity distribution not having these problems.

An image converter may be used as such to make the respective intensity distribution visible to the human eye. It can, however, also comprise an image sensor for recording the converted intensity distribution.

BACKGROUND OF THE INVENTION

An image converter for amplifying the light intensity of an intensity distribution of an electromagnetic radiation is known from DE-Patent 535 208. A photoelectric layer is provided as a converter layer, out of which the electromagnetic radiation releases electrons, and which at the same time serves as a cathode of an adjacent flat tube. In the tube, the released electrons are accelerated against an anode, which emits light due to the incident electrons, the light being usable for illuminating an adjacent photographic layer. The spectral properties of the photoelectric layer define the spectral sensitivity range of the image converter, which is limited to 200 to 1300 nm and which often is much narrower.

The image converter known from DE-Patent 535 208 is, for example, used in so-called night vision devices. Infrared light not visible to the human eye or residual light insufficient for the human eye is made visible to the human eye with night vision devices, the accelerated and usually additionally amplified electrons being caught by a luminescence screen consisting of material luminescent in the visible range. Here, the electrons activate the luminescence, the distribution of which over the luminescence screen corresponds to the intensity distribution of the infrared or residual light incident on the photoelectric layer. The luminescence screen can be directly viewed with the eye or imaged onto an image sensor array.

In a variant of the image converter known from DE-Patent 535 208 which has been developed by the company PROXITRONIC in Darmstadt, light which is to be made visible is imaged onto a flat tube in which a suitable gas is subject to high voltage. The light incident in the tube results in an ionization of the gas. Due to the applied high voltage, the electrons of the ionized gas are accelerated towards a luminescence screen and cause luminescence, the distribution of which over the luminescence screen corresponds to the intensity distribution of the light to be made visible incident on the flat tube.

All image converters based on the general principle known from DE-Patent 535 208 are only designed for very low intensities of the viewed electromagnetic radiation and thus not suitable for visualization of an intensity distribution of a stronger electromagnetic radiation. To nevertheless enable them for this purpose, the incident electromagnetic radiation has to be strongly artificially attenuated. Doing this, however, the sensitivity of the image converter for weak intensity gets lost.

A further image converter working according to the general principle known from DE-Patent 535 208 is known from U.S. Pat. No. 2,572,494. This image converter comprises a heating device for raising the temperature of the photoelectric layer out of which the electric radiation releases electrons into the range of 40° C. or 50° C. At this temperature the electron current through the acceleration tube shall be in the order of $10^{-10}$ A/cm$^2$. I.e. the increase in temperature provides a minimum electron current through the tube.

Further image converters are known in which the electromagnetic radiation the intensity distribution of which is to be made visible is directly incident on a luminescence screen used as a converter layer. Here, the electromagnetic layer may not only activate luminescence, but alternatively also deactivate an existing luminescence by stimulated emission resulting in a negative image of the intensity distribution of interest. The activation of the luminescence may be due to a quantum optics excitation of the luminescence screen or due to a quantum optics or thermal stimulation of a luminescence screen preloaded with short wave radiation. All luminescence screens with luminescence excited or de-excited by quantum-optical effects only have a small banded spectral sensitivity range.

Image converters having a so-called microbolometer array make use of temperature dependent electrical properties of individual elements of the microbolometer array to register a temperature distribution over the elements of the microbolometer array caused by an electromagnetic radiation incident on the microbolometer array.

It is known to apply thermochrome paint layers, for example made of liquid crystals, onto surfaces to visualize temperature distributions over surfaces.

In an image converter known from DE 101 58 859 B4, the converter layer is the reflecting coating of a laser mirror. The temperature distribution over the reflection layer caused by the incident laser radiation which is essentially reflected by the reflection layer is made visible in that the reflection layer is arranged on an expansion layer which expands depending on its temperature, and in that the resulting deformations of the reflection layer due to local thermal expansions of the expansion layer are registered with a laser interferometer. No direct image of the intensity distribution of the laser radiation is obtained in this way, and high efforts have to be taken to at all register the local thermal expansions of the expansion layer occurring at a very low level. Vice versa, the known image converter having the features of the preamble of claim 1 is suitable for a high bandwidth of intensities of the incident electromagnetic radiation inclusive of laser radiation of high local intensity, and it has a big spectral sensitivity range.

SUMMARY OF THE INVENTION

The present invention relates to an image converter for visualizing an intensity distribution of an incident electromagnetic radiation, the image converter comprising: an absorption layer which at least partially converts the incident electromagnetic radiation into heat and thus the intensity distribution of the incident electromagnetic radiation into a corresponding temperature distribution, a converter layer which adopts the temperature distribution corresponding to the intensity distribution of the incident electromagnetic radiation and emits an optically detectable heat radiation having an intensity distribution corresponding to the temperature distribution, and a temperature adjusting device for adjusting the temperature of the converter layer to shift the heat radiation emitted by the converter layer into a predetermined range of wave lengths.

In the new image converter, a temperature adjusting device which may be a heating device for increasing the temperature of the converter layer is provided. By increasing the temperature of the converter layer, the heat radiation emitted by the converter layer is shifted toward shorter wave lengths. Already at an increase in temperature of the converter layer up to 500 to 600 K, the shift has such an extent that the heat radiation emitted by the converter layer can be registered with a usual semiconductor image sensor array. An even slightly higher increase in temperature results in that the heat radiation emitted by the converter layer is also visible to the human eye. Thus, also the temperature distribution over the converter layer caused by the incident electromagnetic radiation which is superimposed with the increase in temperature of the converter layer caused by the heating device becomes visible. In other cases the temperature adjusting device may be used to cool down the converter layer to keep the heat radiation emitted by the converter layer in the visible range.

For recognizing changes of the intensity distribution of the electromagnetic radiation incident on the converter layer it is sufficient that the temperature adjusting device, without the intensity distribution of the electromagnetic radiation to be made visible, causes a temperature distribution over the converter layer which is constant over time or which is varied with time in a defined way. Each change in heat radiation emitted by the converter layer is then ascribable to a change in the intensity distribution of the electromagnetic radiation incident on the converter layer.

If the temperature adjusting device causes a homogeneous temperature distribution over the converter layer without the intensity distribution to be made visible, the intensity distribution of the electromagnetic radiation can be directly registered by viewing the converter layer or the heat radiation emitted by it. Any local increase in intensity of the heat radiation from the converter layer corresponds to an intensity contribution by this incident electromagnetic radiation.

In the new image converter it is not required that the heating device increases the temperature of the converter layer to such an extent that heat radiation from the converter layer becomes visible without the electromagnetic radiation being incident the intensity distribution of which is to be made visible. It Is only essential that there, where relevant intensities of the incident electromagnetic radiation cause a temperature increase of the converter layer, detectable heat radiation is emitted by the converter layer. "Detectable heat radiation" means such a heat radiation which is either directly visible to the human eye or which can be detected with simple image sensor arrays, i.e. directly and without any interconnected image amplifier.

Against this background it is preferred that the heating power of the heating device which increases the temperature of the converter layer is adjustable so that the new image converter can be used for very different intensities of the incident electromagnetic radiation. With very small intensities of the incident electromagnetic radiation it is often suitable to heat the converter layer to further extent than in case of an electromagnetic radiation having a very high intensity, which thus only needs a little support to heat up the converter layer to such temperatures at which it emits visible or detectable heat radiation. To completely register the intensity distribution of the incident electromagnetic radiation, the temperature of the converter layer may also be successively heated up to different temperatures to successively set different intensity ranges of the incident electromagnetic radiation to optimum gain.

The heating device of the new image converter can be designed as a heating radiation source so that it increases the temperature of the converter layer by means of radiation energy which is converted into heat by the converter layer or by a further layer arranged in parallel thereto. The wavelength at which the heating radiation source supplies radiation energy may fall in the visible or invisible range of electromagnetic radiation and may thus also be identical with the wavelength of the electromagnetic radiation the intensity distribution of which is to be made visible. Particularly, the heating radiation source can also be a microwave source or a source for an alternating magnetic field causing eddy currents in the converter layer. Alternatively, the heating radiation source may also emit a sound wave, like for example an ultra sound wave, for heating up the converter layer.

In a particularly preferred embodiment of the new image converter, the heating device comprises a resistive heating element which upon inducing eddy currents or applying an outer voltage converts electric energy into heat to increase the temperature of the converter layer. Here, the resistive heating element is preferably to be arranged in parallel to the converter layer being in as direct contact to the converter layer as possible, or the converter layer itself is to be designed as the resistive heating element.

The converter layer may convert the incident electromagnetic radiation into a temperature distribution corresponding to its intensity distribution itself, or a separate absorption layer being in contact with the converter layer is to be provided to this end. In a multilayer structure, that layer is to be regarded as the converter layer, which emits the visible or easily detectable heat radiation, and it is clear that the increase in temperature of this converter layer by means of the heating device is essential. As a rule, the layers considered here are, however, arranged so close to each other that they are together heated up by the heating device or by the incident electromagnetic radiation converted into heat.

The converter layer of the new image converter may also be arranged on a carrier substrate or between two carrier substrates, which are used for purposefully dissipate heat out of the converter layer to, for example, avoid a heat accumulation in the converter layer with high intensities of the incident electromagnetic radiation, or to thermally isolate the converter layer from a gas in its surroundings to avoid heat striae in the gas. If the converter layer shall be viewed through the carrier substrate in the later case, or if the electromagnetic radiation shall be incident through the carrier substrate, the carrier substrate has to be transparent for the heat radiation of the converter layer or the incident electromagnetic radiation and may itself not emit disturbing heat radiation. Quartz is, for example, suited as a material for such a substrate.

The converter layer may also be limited by gas or vacuum on both of its sides so that the image converter comprises a completely one-layered construction in the area of the converter layer.

Depending on the construction of the new image converter, i.e. particularly with regard to its thermal capacity, time constants defining the temporal resolution of the image converter (half-lives) down to 10 ms may be realized.

A superimposed quick forced motion of the gas and/or a horizontal orientation of the converter layer so that the convection of the gas is at least approximately homogeneous over the surface of the converter layer are alternatives with regard to a transparent thermal isolation to the end of avoiding heat striae or other inhomogeneous thermal effects due to convection in a gas adjoining the converter layer.

The absorption layer of the new image converter can be mirrored to reflect an essential part of the incident electromagnetic radiation. This is particularly suitable, if the incident electromagnetic radiation has a very high intensity and if a small part of this intensity is sufficient for visualizing its intensity distribution, or if the visualizing the intensity distribution of the electromagnetic radiation shall take place at the same time as the electric radiation is used to another end. Particularly, the absorption layer may form a laser mirror.

In the new image converter, an image sensor array may be provided on which a thermal image of the converter layer is imaged. The image sensor array can be arranged in close distance in parallel to the converter layer to register the heat radiation from the converter layer directly, i.e. without interconnecting optics. However, it is preferred, if an optic is provided which images the thermal image of the converter layer onto the image sensor array. This measure typically also increases the distance of the image sensor array from the converter layer, and thus reduces the danger of an undesired heating-up of the image sensor array. Heating-up the image sensor array at least increases the thermal noise. In case of an extreme increase in temperature, the image sensor array which is typically based on semiconductor techniques may also be destroyed.

An optical heat protection filter may be arranged between the converter layer and the image sensor array for thermally isolating the image sensor array from the converter layer. This optical heat protection filter may shield the converter layer from heat radiation having a longer wave length than visible to the image sensor array of the imager sensor array.

The image sensor array may be arranged on that side of the converter layer from which the electromagnetic radiation having the intensity distribution of interest is incident. However, it is often preferred, if the image sensor array is provided behind the converter layer in the direction of the incident intensity distribution. In this case, the image converter, any separate absorption layer, the image sensor array as well as the heating device for the converter layer may be arranged in a housing which shields the absorption layer and particularly of the image sensor array from ambient light.

When the heating device for increasing the temperature of the converter layer comprises a heating radiation source, this heating radiation source may be arranged either on the side of the converter layer from which the electromagnetic radiation is incident or at its other side.

The image sensor array of the new image converter can be a conventional CCD-chip available at low cost. Such a CCD-chip comprises a much higher spatial resolution than the image converter of night vision devices known in the prior art, and it is much cheaper at the same time.

The extreme bandwidth of the spectral sensitivity range of the new image converter of 100 to 100,000 nm can be limited by means of a variation of the spectral sensitivity of the absorption layer or by means of a pre-filter arranged in front of the absorption layer to a selectable small banded range.

In the new image converter it is particularly possible to completely register the intensity profile of a high energy laser beam. To this end, it is necessary to also register, besides the intensity maxima, such areas of the intensity distribution in which an intensity is present which is much lower than the intensity maxima. Only with completely registering the intensity profile of a laser beam it is possible, for example, to exactly determine its essential beam parameters, like for example its beam center of intensity.

A further advantage of the invention is that the new image converter may have a virtually arbitrarily big converter surface. This also allows for a particularly high spatial resolution in visualizing the intensity distribution of the incident electromagnetic radiation.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
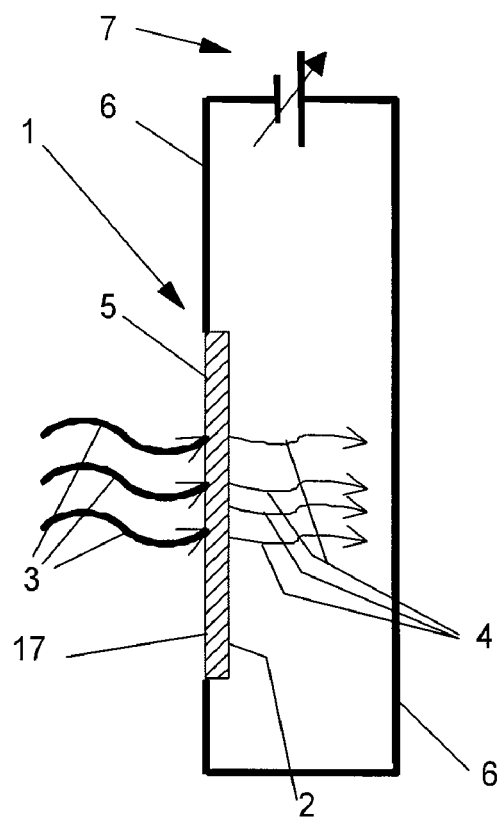
FIGS. 1 to 7 each show a schematic longitudinal section through one of seven embodiments of the new image converter.

Referring now in greater detail to the drawings, FIG. 1 depicts an image converter 1 consisting of a converter layer 2 which at the same time serves as an absorption layer 17 here to convert an incident electromagnetic radiation 3 into heat. In doing this, a temperature distribution over the converter layer 2 is formed, which corresponds to an intensity distribution of the electromagnetic 3 over the converter layer 2. To make this temperature distribution visible to the human eye in form of heat radiation 4 from the converter layer 2, the converter layer 2 is made as a resistive heating element and connected to an adjustable voltage source 7 via electric connections 6. By means of the voltage source 7 a current through the resistive heating element 5 is created which results in a homogeneous increase in temperature of the resistive heating element 5, i.e. of the converter layer 2. This increase in temperature is driven so far that the heat radiation 4 gets into the wave length range visible to the human eye with sufficient intensity. In this way, the intensity distribution of the electromagnetic radiation 3 becomes visible to the human eye, because it is superimposed with the homogeneous temperature increase of the converter layer by means of the voltage source 7. All intensity peaks of the visible heat radiation 4 are thus due to the intensity distribution of the electromagnetic radiation 3 over the converter layer 2. The voltage source 7 can be adjusted in such a way that no heat radiation 4 is emitted by the converter layer 2, which is visible to the human eye, only due to the increase in temperature of the converter layer 2 generated by it, and that only the additional increase in temperature due to the incident electric radiation 3 results in a visible heat radiation. In a particular example, the converter layer 2 or the resistive heating element 5 are made of a foil of constantan.

Figure 2:
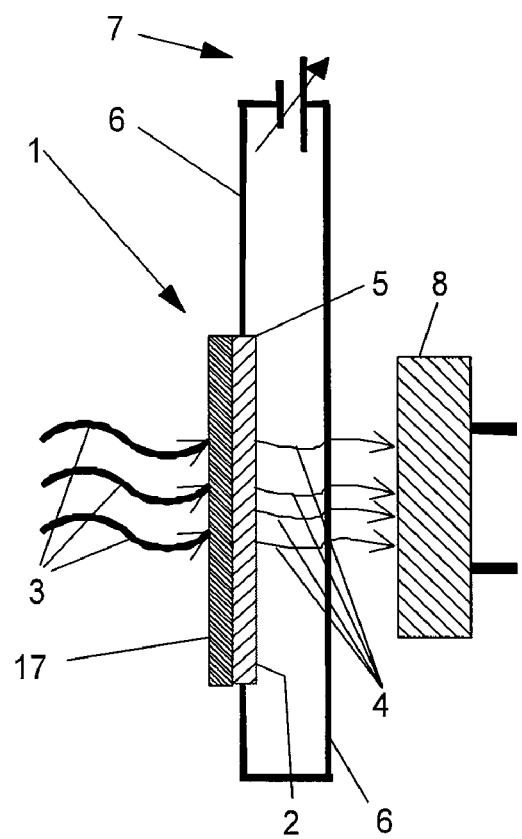

The image converter according to FIG. 2 differs from the embodiment according to FIG. 1 in the following points: The converter layer 2 is not as such provided as an absorption layer 17 here but the absorption layer 17 is arranged in parallel to and in direct contact with the converter layer 2. From the point of view of the absorption layer 17, an image sensor array 8 is arranged behind the converter layer 2 at a close distance to the converter layer 2 so that the image sensor array 8 directly registers the heat radiation 4 from the resistive heating element 5, i.e. without interconnection of an imaging optic. The heat radiation 4 comprises an intensity distribution which is due to the increase in temperature of the resistive heating element 5 caused by the voltage source 7 and the superimposed increase in temperature of the converter layer 2 because of the electromagnetic radiation 3 converted into heat energy by the absorption layer 17. The image sensor array 8 made as a COD-chip is able to register the heat radiation 4 already in a wave length range which is not or hardly visible to the human eye. Correspondingly, the increase in temperature of the converter layer 2 by means of the voltage source 7 and the resistive heating element 5 needs not to be driven as far as in case of the image converter according to FIG. 1 in which the intensity distribution of the electromagnetic radiation 3 shall be made visible to the human eye.

The embodiment of the image converter according to FIG. 3 differs from that one according to FIG. 2 in the following points: The converter layer 2 is provided in addition to a separate resistive heating element 5. By means of the additional mass and the associated additional heat capacity of the converter layer 2 a temporal attenuation between the intensity distribution of the incident electromagnetic radiation 3 and the intensity distribution of the heat radiation 4 is purposefully increased to obtain a certain temporal averaging in the heat radiation with regard to fluctuations in intensity of the electromagnetic radiation 3. Without this measure, the response time of the image converter 1 may be very small and may be in the area of 1/100 seconds. By means of increasing the heat capacity of the converter layer 2, the corresponding time constant may be purposefully increased. Further, the distance of the image sensor array 8 from the converter layer 2 is purposefully increased to avoid an undesired heating of the image sensor array 8. Here, a heat image of the converter layer 2 is imaged by means of an optic 10 onto the image sensor array 8. An optical heat protection filter 11, which shields the image sensor array 8 from long wave heat radiation not detectable by the image sensor array 8 except that its temperature and thus its dark noise is increased as a further measure to thermally shield the image sensor array 8 from the resistive heating element 5. As a last point, a housing 12 of the image converter 1 is depicted in FIG. 3 which includes all parts described here and which protects the absorption layer 17 and the image sensor array 8 against ambient light.

Figure 3:
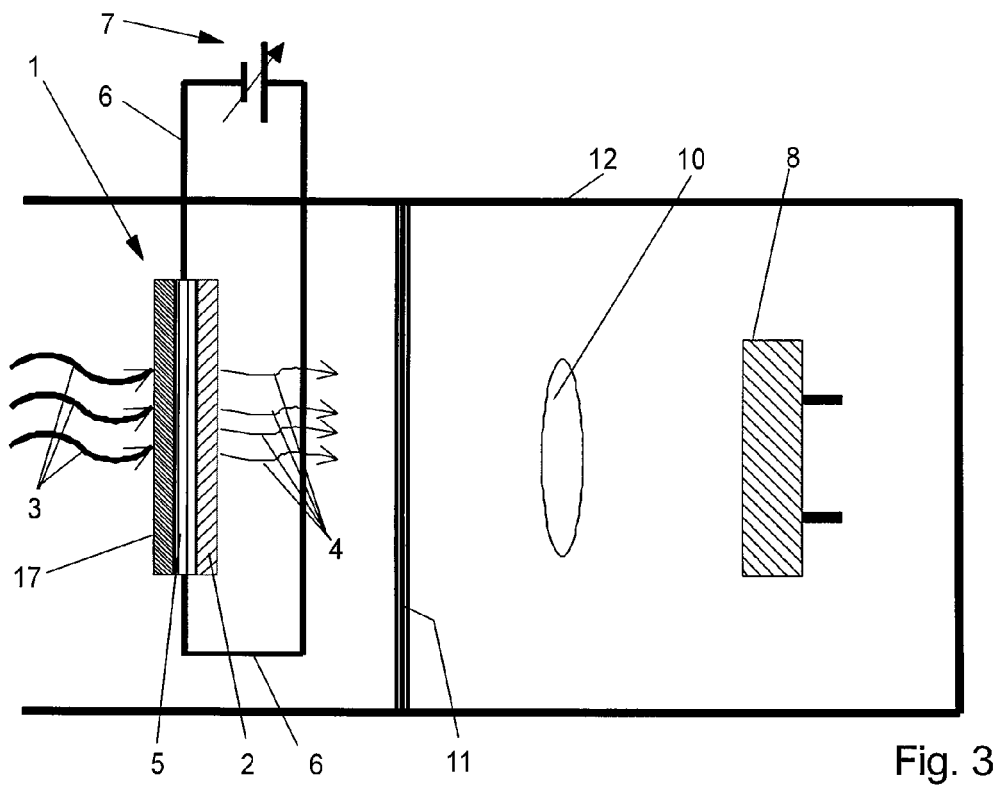
Figure 4:
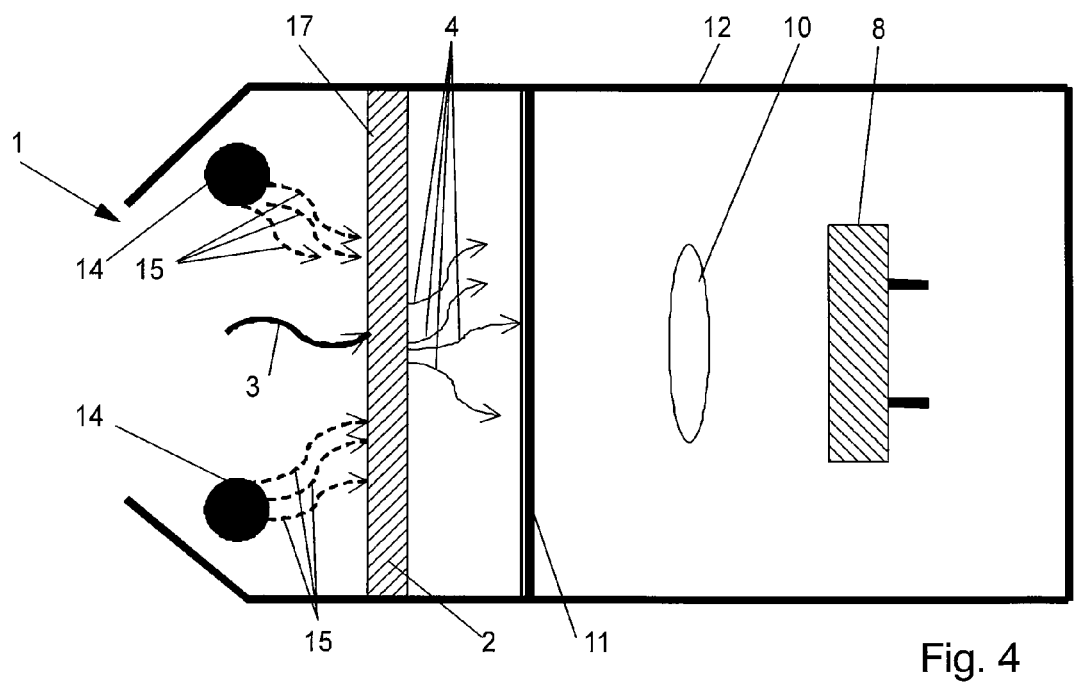

The embodiment of the image converter according to FIG. 4 comprises the following differences from that one according to FIG. 3: For additionally heating the converter layer 2 to raise the heat radiation 4 into a range visible to the image sensor array, no heating device in form of a resistive heating element 5 and the voltage source 7 but in form of a heating radiation source 14 is provided here, which emits the heating radiation 15 onto the converter layer 2. Like the incident electromagnetic radiation 8, the heating radiation 15 is converted into heat by the converter layer 2 and results into an increase in temperature of the converter layer 2 which is extensively homogeneous and at least temporally constant so that spatial and temporal fluctuations of the intensity distribution of the electromagnetic radiation 3 may also be detected here based on spatial and temporal fluctuations of the intensity distribution of the heat radiation 4.

Figure 5:
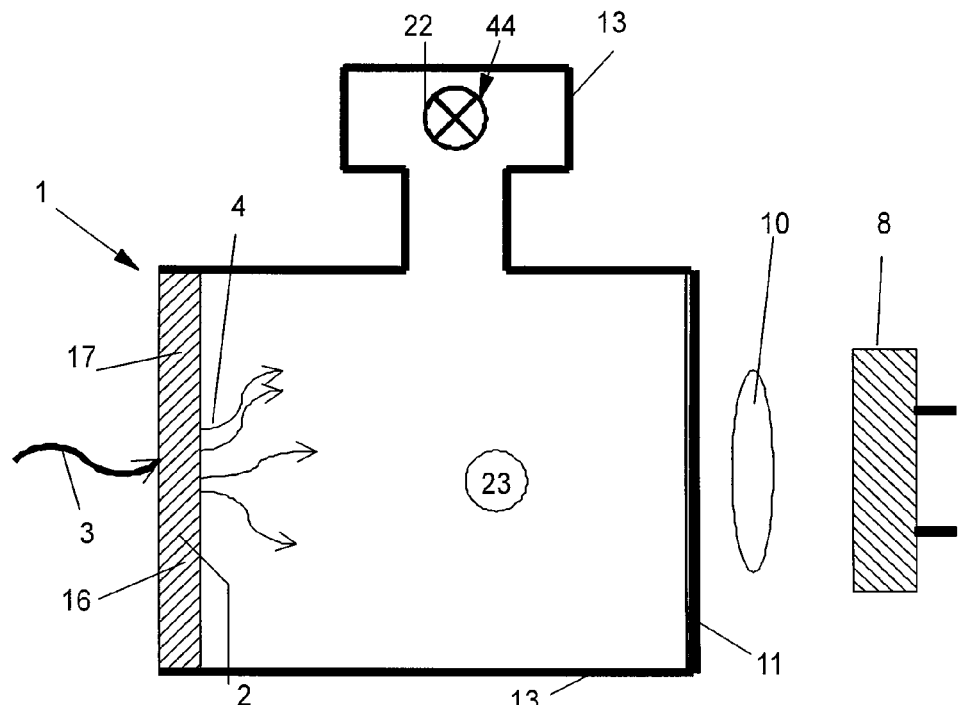

The embodiment of the image converter 1 according to FIG. 5 which is like the embodiment of the following figures depicted without the housing shown in FIGS. 3 and 4 although it may also have such a housing has a microwave antenna 22 as a heating radiation source 14. The microwave antenna 22 is provided in a microwave resonator 13, the walls of which are partly formed by the converter layer 2 and partly by the heat protection filter 11. The converter layer 2 has such a composition here, that it is selectively heated up by the microwave radiation from the microwave antenna 22. In the interior 23 of the microwave resonator 13 a vacuum may be provided to avoid the formation of heat striae in a gas adjoining the converter layer 2, or the occurrence of other effects due to convection in such a gas. Further, the absorption layer which is formed by the converter layer 2 here is partially mirrored at its surface 16 for the wave length range of the electromagnetic radiation 13 to purposefully only convert a part of the electromagnetic radiation into heat. The reflected remainder of the electromagnetic radiation 3 can be used in another way, wherein this remainder may be the essential part of the incident electromagnetic radiation 3 and wherein the intensity distribution of this remainder may also be known due to the detection of the heat radiation 4 with the image sensor array 8.

Figure 6:
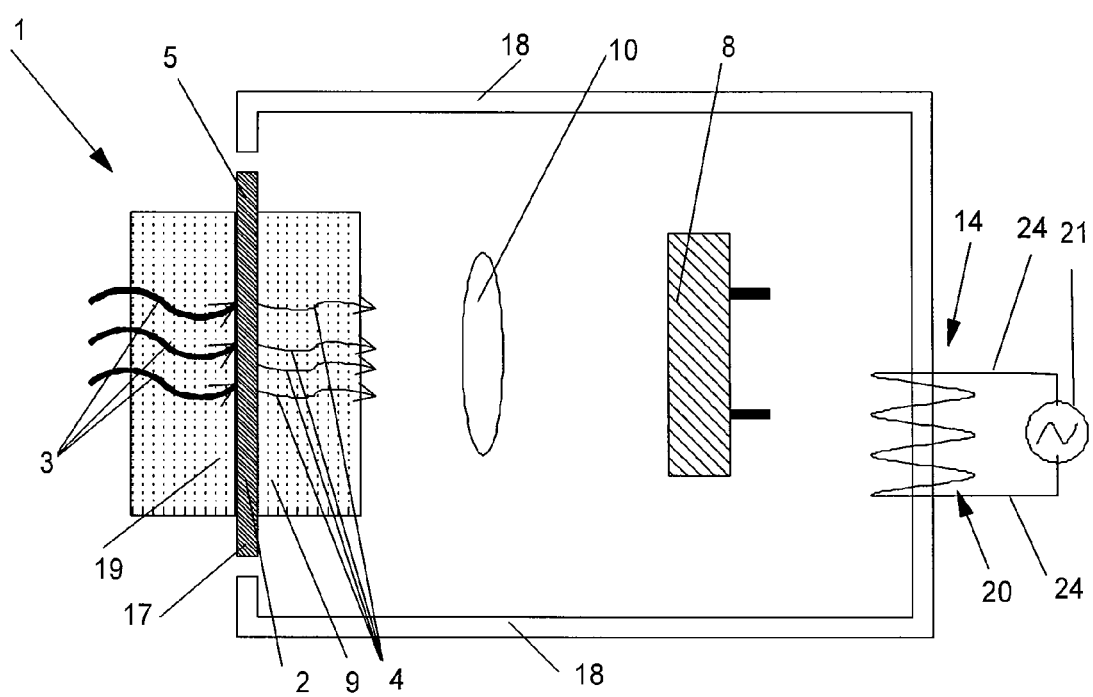

In the embodiment according to FIG. 6 the converter layer 2 is arranged between two carrier substrates 9 and 19, wherein the carrier substrate being provided at the side of the incident electromagnetic radiation 3 is transparent for the electromagnetic radiation 19 and the carrier substrate 9 arranged on the other side is transparent for the heat radiation 4. The carrier substrates 9 and 19 provide a thermal isolation of the converter layer 2 with regard to their surroundings to inhibit potential convection effects. Additionally, they also serve for adjusting the time constant of the conversion of the intensity distribution of the electromagnetic radiation 3 in that one of the heat radiation 4. In addition to that, FIG. 6 indicates an inductive increase of the temperature of the converter layer 2, which here also serves as an absorption layer 17. To this end, a heating radiation source 14 is provided in form of an alternating current source 21 which is connected to an induction coil 20 via electrical connections 24 and which excites an alternating magnetic field in a yoke 18 via the induction coil 20 so that with a suitable design of the converter layer 2 the alternating magnetic field which constitutes a heating radiation induces eddy currents in the converter layer 2. As the converter layer 2 is also made as a resistive heating element 5 here, it converts the eddy currents into heat which results in its desired increase in temperature.

Figure 7:
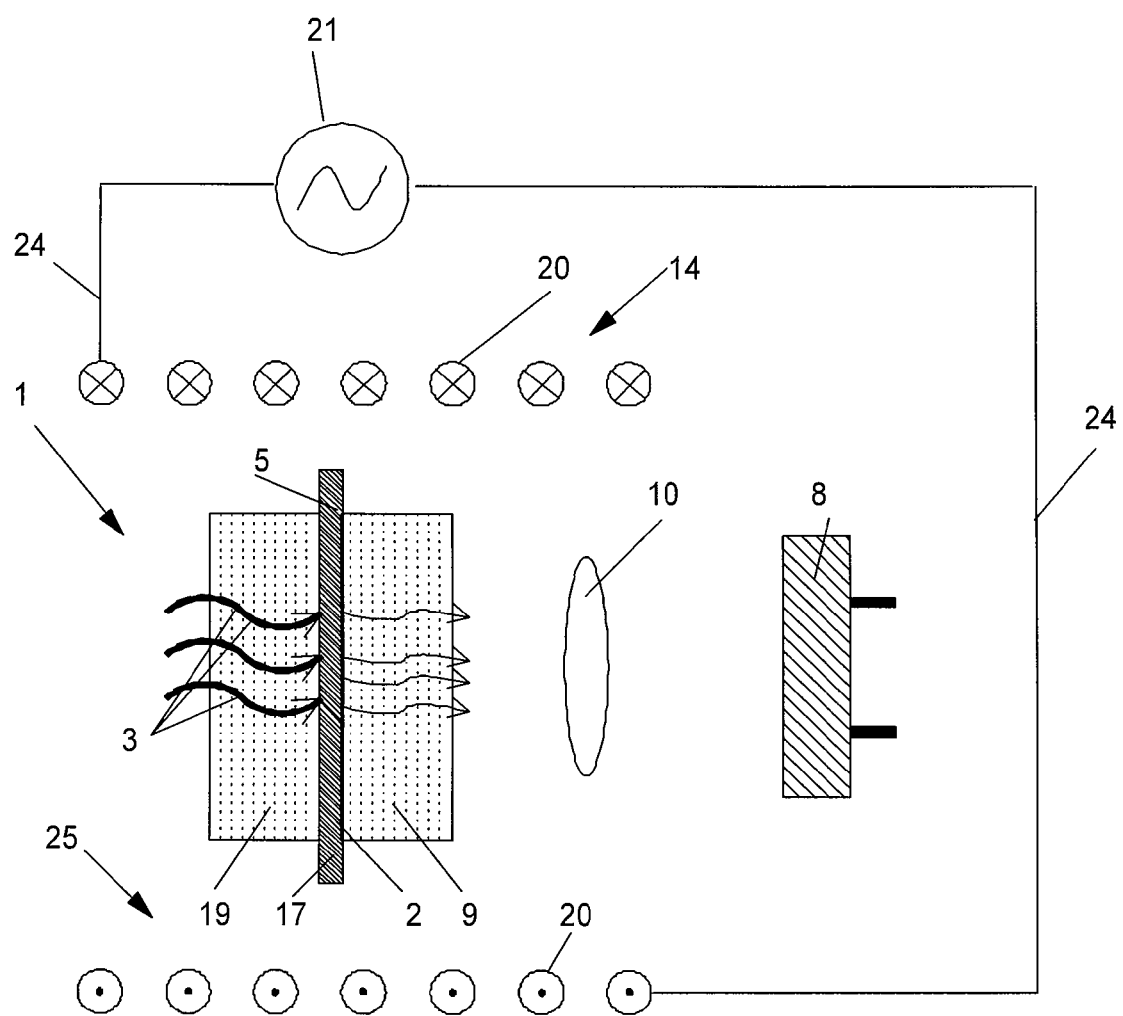

The embodiment according to FIG. 7 differs from that one according to FIG. 6 by avoiding a closed-loop guidance for the alternating magnetic field. Instead, the converter layer 2 made as a resistive heating element 5 is directly arranged within the induction coil 20 made as an air-gap coil 25 here. This arrangement has two advantages over that one according to FIG. 6. As a first point, the magnetic field inclusive of its changes over the cross-section of the air-gap coil 25 is very homogeneous so that the converter layer is very homogeneously heated up. As a further point, the lines of magnetic flux in the air-gap coil run in parallel to its axis, i.e. orthogonal to the converter layer 2 so that eddy currents are induced which flow in parallel to the plane of main extension of the converter layer 2 and which are thus not geometrically hindered.

Many variations and modifications may be made to the preferred embodiments of the invention without departing substantially from the spirit and principles of the invention. All such modifications and variations are intended to be included herein within the scope of the present invention, as defined by the following claims.

We claim:

1. An image converter for visualizing an intensity distribution of an incident electromagnetic radiation, the image converter comprising:
    an absorption layer which at least partially converts the incident electromagnetic radiation into heat and thus the intensity distribution of the incident electromagnetic radiation into a corresponding temperature distribution,
    a converter layer which adopts the temperature distribution corresponding to the intensity distribution of the incident electromagnetic radiation and emits an optically detectable heat radiation having an intensity distribution corresponding to the temperature distribution, and
    a temperature adjusting device for adjusting the temperature of the converter layer to shift the heat radiation emitted by the converter layer into a predetermined range of wave lengths.

2. The image converter according to claim 1, wherein the converter layer includes the absorption layer.

3. The image converter according to claim 1, wherein the absorption layer is provided in addition to the converter layer and transfers the temperature distribution corresponding to the intensity distribution of the incident electromagnetic radiation onto the converter layer.

4. The image converter according to claim 1, wherein the temperature adjusting device, without the incident electromagnetic radiation, generates a temporally constant temperature distribution over the converter layer.

5. The image converter according to claim 1, wherein the temperature adjusting device, without the incident electromagnetic radiation, generates a homogeneous temperature distribution over the converter layer.

6. The image converter according to claim 1, wherein the temperature adjusting device comprises a heating device for increasing the temperature of the converter layer to shorten the wavelengths of the heat radiation emitted by the converter layer.

7. The image converter according to claim 6, wherein the heating device is adjustable with regard to its heating power.

8. The image converter according to claim 6, wherein the heating device comprises a heating radiation source.

9. The image converter according to claim 6, wherein the heating device comprises a resistive heating element.

10. The image converter according to claim 9, wherein the converter layer forms the resistive heating element.

11. The image converter according to claim 1, wherein the converter layer is arranged on a transparent carrier substrate.

12. The image converter according to claim 1, wherein the converter layer is delimited by gas on at least one of its sides.

13. The image converter according to claim 1, wherein the converter layer is delimited by vacuum on at least one of its sides.

14. The image converter according to claim 1, wherein the converter layer is partially mirrored.

15. The image converter according to claim 1, wherein the temperature adjusting device adjusts the temperature of the converter layer to shift the heat radiation emitted by the converter layer into a visible range of wave lengths.

16. The image converter according to claim 1, wherein an image sensor array is provided onto which a thermal image of the converter layer is imaged.

17. The image converter according to claim 16, wherein an optic is provided which images the thermal image of the converter layer onto the image sensor array.

18. The image converter according to claim 16, wherein an optical heat protection filter is provided between the converter layer and the image sensor array.

19. The image converter according to claim 16, wherein the image sensor array, in the direction of the incident electromagnetic radiation, is arranged behind the converter layer.

20. The image converter according to claim 16, wherein the image sensor array is a CCD-chip.

* * * * *